United States Patent
Taylor

(10) Patent No.: US 6,542,583 B1
(45) Date of Patent: *Apr. 1, 2003

(54) CALLER IDENTIFICATION VERIFICATION SYSTEM

(75) Inventor: Glen A. Taylor, Columbus, OH (US)

(73) Assignee: Avaya Technology Corp., Basking Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/812,470

(22) Filed: Mar. 6, 1997

(51) Int. Cl.[7] .................... H04M 1/64; H04M 1/56; H04M 3/00

(52) U.S. Cl. ................... 379/88.02; 379/88.08; 379/88.19; 379/142.05; 379/189; 379/190; 379/194; 379/196; 379/207.11; 379/207.13

(58) Field of Search ............. 379/67.1, 70, 88.02, 379/88.17, 88.22, 88.18, 88.01, 88.19, 88.21, 88.25, 903, 93.12, 93.03, 93.25, 88.08, 142.05, 189, 190, 194; 340/825.34, 825.31; 713/182–186, 200–202; 455/410; 705/44; 463/40–42; 348/12–16

(56) References Cited

U.S. PATENT DOCUMENTS

| | | | | |
|---|---|---|---|---|
| 4,451,701 A | * | 5/1984 | Bendig | 379/93.25 |
| 4,757,525 A | * | 7/1988 | Matthews et al. | 379/89 |
| 5,018,190 A | * | 5/1991 | Walker et al. | 379/95 |
| 5,125,022 A | * | 6/1992 | Hunt et al. | 379/88.02 |
| 5,276,731 A | * | 1/1994 | Arbel et al. | 379/88 |
| RE34,587 E | * | 4/1994 | Crane et al. | 379/88 |
| 5,345,549 A | * | 9/1994 | Appel et al. | 395/154 |
| 5,353,336 A | * | 10/1994 | Hou et al. | 379/57 |
| 5,499,288 A | * | 3/1996 | Hunt et al. | 379/88.02 |
| 5,517,558 A | * | 5/1996 | Schalk | 379/88.02 |
| 5,594,638 A | * | 1/1997 | Iliff | 395/203 |
| 5,692,106 A | * | 11/1997 | Towers et al. | 395/50 |
| 5,719,560 A | * | 2/1998 | Watkins | 340/825.34 |
| 5,764,275 A | * | 6/1998 | Lappington et al. | 348/12 |
| 5,815,665 A | * | 9/1998 | Teper et al. | 709/229 |
| 5,821,871 A | * | 10/1998 | Benzler | 340/825.34 |
| 5,893,083 A | * | 4/1999 | Eshghi et al. | 706/45 |
| 5,907,597 A | * | 5/1999 | Mark | 379/93.03 |
| 5,916,024 A | * | 6/1999 | Von Kohorn | 463/40 |
| 6,014,441 A | * | 1/2000 | Mark | 379/361 |
| 6,292,782 B1 | * | 9/2001 | Weideman | 704/273 |

* cited by examiner

Primary Examiner—Alan Hoosain

(57) ABSTRACT

A process, apparatus and system are disclosed for verifying the authenticity of a user before providing the user with a desired service. The process involves first receiving a request from the user. Next, a question set is fetched corresponding to the user. The question set concerns information of a private nature that someone with rightful access to the desired services should know. The question set has at least one question and a possible answer or list of possible answers corresponding to the question. The question is then transmitted to the user along with the possible answer(s). After receiving a response from the user, a record is made whether the response correctly identified the possible answer as being correct or not. Finally, after the number of questions transmitted to the user reaches a predetermined number, a determination is made whether the number of incorrect responses exceeds a certain limit. If the number of incorrect responses exceeds the certain limit, then the user is refused the desired service. Otherwise, the user is provided with the desired service.

16 Claims, 3 Drawing Sheets

CALLER IDENTIFICATION VERIFICATION SYSTEM

BACKGROUND OF THE INVENTION

1. Field of Invention

The invention relates generally to a telecommunications security system for ascertaining the veracity of a user before providing the user with services or access to confidential information. More specifically, the invention involves an automated system for verifying the identity of a caller by posing one or more questions to the caller which relate to information that only a person having rightful access to the services or confidential information would be likely to know.

2. Background

Telecommunications have enabled business to conduct transactions and transfer information at unprecedented speeds. Tools like the telephone and the internet allow parties miles away to conduct business almost as if they were face to face. One shortcoming of conducting business in this fashion, however, is verifying that the other party is indeed who he or she claims to be. Such a verification is important if confidential information is to be revealed or valuable services are to be rendered.

Traditionally, verifying a caller's authenticity was performed by keeping private information on file that a person who has rightful access to the confidential information would be likely to know. For example, if a person called his stock broker to obtain his current balance, he may first provide a customer service representative with his account number. The representative may then ask an open-ended question relating to the private information, for example, "What is your mother's maiden name?" The representative then interprets the caller's response, and compares it with the correct answer to verify the caller's identity. If the caller responds correctly, then the representative can reasonably assume that the caller is authentic, and provide him with the requested confidential information such as an account balance, or perform a service such as transferring funds.

Although this system performs well when a person receives the call and can understand the caller's response, it does not lend itself to automation. An automated system would require sophisticated voice recognition capabilities that may be impractical and perhaps impossible. For example, many voice recognition packages require the system to "learn" the user's voice characteristics and maintain a catalog of sounds. Such extravagant measures are impractical for institutions such as banks or brokerage houses which service thousands of clients.

Therefore, an automated security system in the field of telecommunications is needed that verifies the right of a user to access certain confidential information or services without the need for sophisticated voice recognition packages. The present invention fulfills this need.

SUMMARY OF THE PRESENT INVENTION

The present invention relates to a security method, apparatus and system for verifying the authenticity of a user before providing the user with a desired service or confidential information. In a process embodiment of the invention, a request is received from the user, and then a question set is fetched corresponding to the user. The question set concerns private information that a person having rightful access to the desired services should know. The question set has at least one question and a possible answer or a list of possible answers. The question is then transmitted to the user along with the possible answer(s). After receiving a response from the user, a record is made whether or not the response is correct. A correct response, for example, may correctly identify which answer is correct/incorrect from a list of possible answers, or it may indicate whether or not a possible answer is correct/incorrect. Finally, after a predetermined number of questions are transmitted to the user, a determination is made whether the number of incorrect/correct responses received from the user exceeds a certain limit. It should be understood that since correct and incorrect answers are conversely related, a determination based on one necessarily relates to a determination based on the other. The decision on which one to consider is arbitrary. If the number of incorrect responses exceeds the certain limit, then the user is refused the desired service. On the other hand, if the number does not exceed the limit, then the user is provided with the desired service.

In the preferred embodiments, the present invention employs a number of safeguards against infiltration by an imposter attempting to gain access through trial and error. First, the list of possible answers corresponding to a particular question remains substantially the same each time the question is transmitted to the user. This eliminates the ability to determine the correct answer by monitoring the possible answers and observing which one is consistently provided. Second, the question set contains a multiplicity of questions which decreases the probability of gaining entry by guessing. Third, a determination is made whether to provide or deny the desired services only after the user responds to a predetermined number of questions from the question set (preferably all of them). If the user fails to respond adequately, he is simply denied the desired service—he receives no clue as to which questions were answered correctly or incorrectly. Fourth, the system prevents a computer "hack" from repeated attempts to access the information by implementing a lock condition. In one embodiment, a lock condition results when a user responds incorrectly to a certain number of questions over a predetermined period of time. Once a lock condition is imposed, the user can no longer use the automated system to gain access to the desired services.

The present invention therefore provides a means of automatically ascertaining the authenticity of a user with a high measure of reliability and without the need for sophisticated voice recognition equipment.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

DETAILED DESCRIPTION OF THE PRESENT INVENTION

The present invention is directed to a security system for ascertaining the authenticity of a user before providing the user with a desired service. As used herein, the term "desired service" broadly refers to an information transaction.

Examples of desired services include business transactions, such as transferring funds or ordering merchandise, the release of important or confidential information, such as bank account information or medical history, and any other information transaction where a need for security exits. The system is particularly well suited in the field of telecommunications where information services are common and the preference for automation is strong, but where visual identification is typically impractical.

The present system verifies the authenticity of a user by asking for private information and enabling the user to respond with reliable telecommunication input such as touch tones (DTMF) or simple voice commands. As used herein, the term "private information" refers to information that is not commonly known, but should be known to those having rightful access to the desired services secured by the system.

Figure 1:
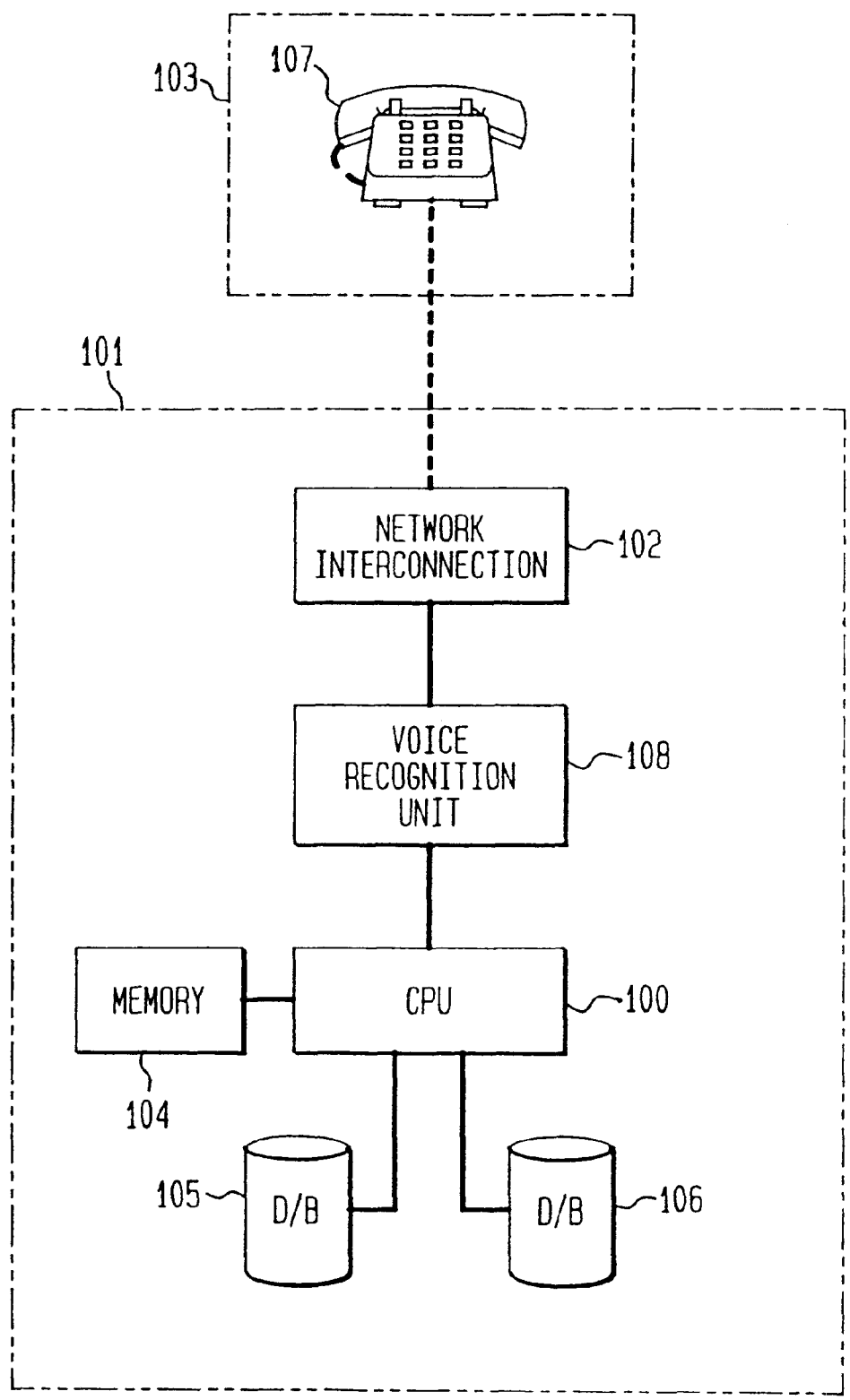
FIG. 1 shows a system diagram of the present invention.

The system functions using traditional telecommunication hardware. A representative system 101 is shown in FIG. 1. There, a central processing unit (CPU) 100 having a telephone network interconnection 102 is operatively connected to a user interface 103, in this case a telephone 107. The telephone network interconnection can be any device that enables a computer to telecommunicate over land based and/or wireless paths. This includes a modem for interaction with other data communications equipment such as a personal computer, or a voice response unit that is capable of playing messages for a user. In the embodiment shown, a optional speech recognition means 108 is used between the CPU 100 and the telephone network interconnection 102.

In this depiction, the telephone 107 is used as the user's interface 103. A telephone transaction poses unique problems in conducting business and in automation since the user cannot be seen for identification purposes, nor can he communicate directly with the CPU 100 as a person can using a keyboard or mouse. Instead, as mentioned in the Background Section, an attendant is traditionally required to interpret the user's responses. Although a telephone is shown, it should be understood that the present system is applicable to any computer security system having a user interface such as a speaker, keyboard, mouse, touchscreen, etc. Moreover, the system is not restricted to the field of telecommunications, and will function anywhere a computer is used to provide desired services or disseminate confidential information to a particular user or group of users.

Operatively connected to CPU 100 is data base storage means 105, 106 and memory 104 which contains instructional means for enabling the system 101 to perform the method of the present invention. Suitable storage means include hard drives, floppies, CD ROM, tapes and other known storage means. In this particular embodiment, two data bases are used. The first data base 105 contains categories of questions and answers pertaining to private information. This information is used by the system to ascertain the user's authenticity. The second data base 106 contains the confidential or valuable information to which the user seeks to gain access. Someone skilled in the art will recognize, that although two data bases are depicted, they could be combined into one, or, alternatively, split into a variety of other data bases.

Figure 2:
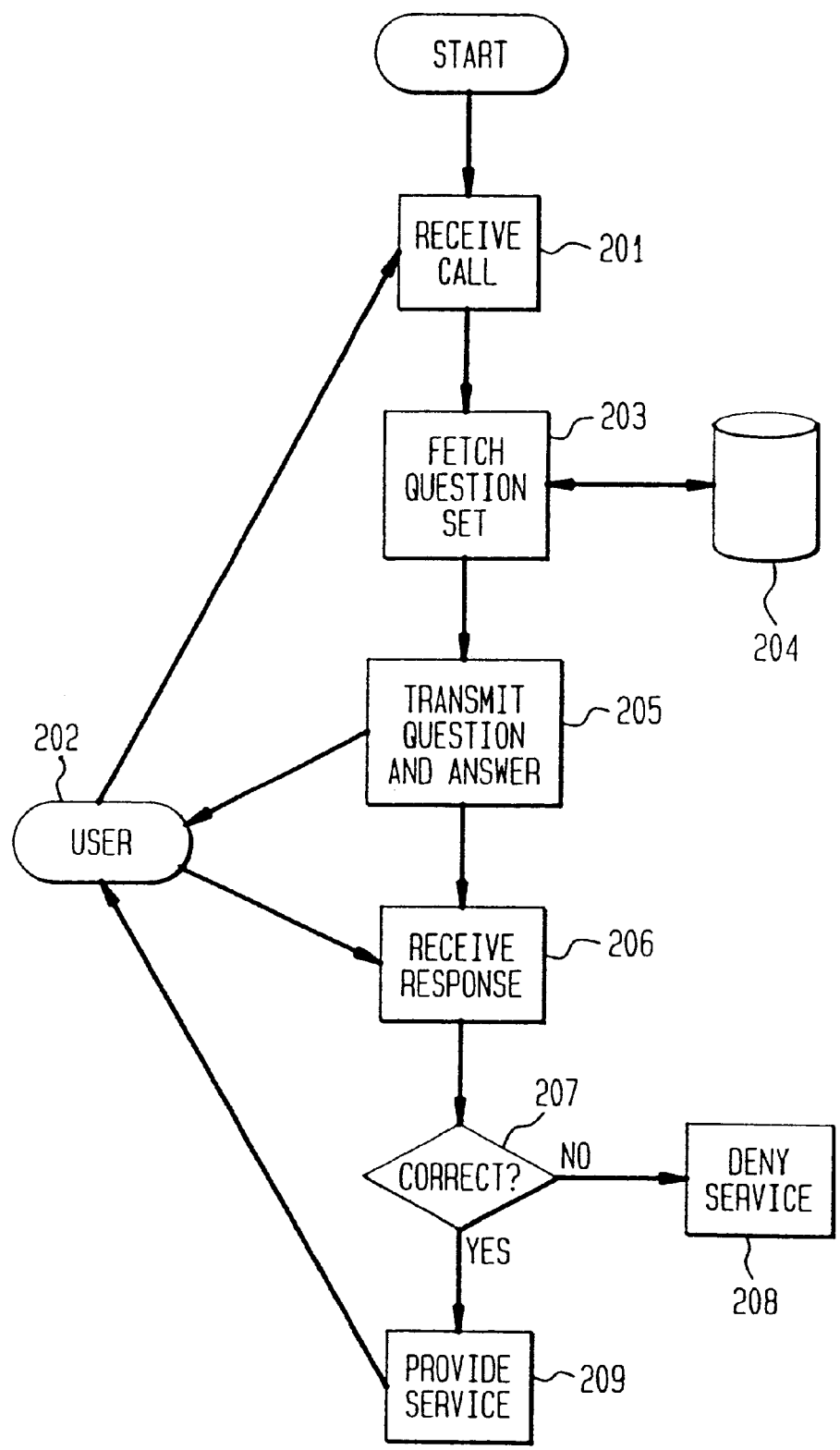
FIG. 2 shows a flow chart of a simple embodiment of the present invention.

The system 101 performs a process according to instructional means in the memory 104. Referring to the basic flow diagram depicted in FIG. 2, an overview of the process is provided. In that Figure, Block 201, the receiving means, receives a request from a user 202. The request corresponds to a particular user specific category. Next, Block 203, the fetching means, fetches a question set corresponding to the specific category from a data base 204. The question set relates to private information that a person having rightful access to the desired service should know. The question set has at least one question and a possible answer or a list of possible answers. As used herein, the term "question" broadly refers to a request for information which may be stated in the form of a question or presented as a request. The possible answer(s) is a plausible answer or response to the information request which may or may not be correct. In Block 205, the transmitting means, the question is transmitted along with the possible answer(s) to the user 202. Block 206, the response receiving means, then receives a response from the user 202. The response identifies whether an answer is correct either by explicitly indicating so, or by selecting it among other possible answers as being correct. A determination is made in Block 207, the determination means, whether the response is correct. If the user 202 correctly responded to the question(s), then Block 209 provides the user 202 with a desired service. On the other hand, if the user 202 failed to respond correctly to the question, then Block 208 refuses the user the desired service.

Figure 3:
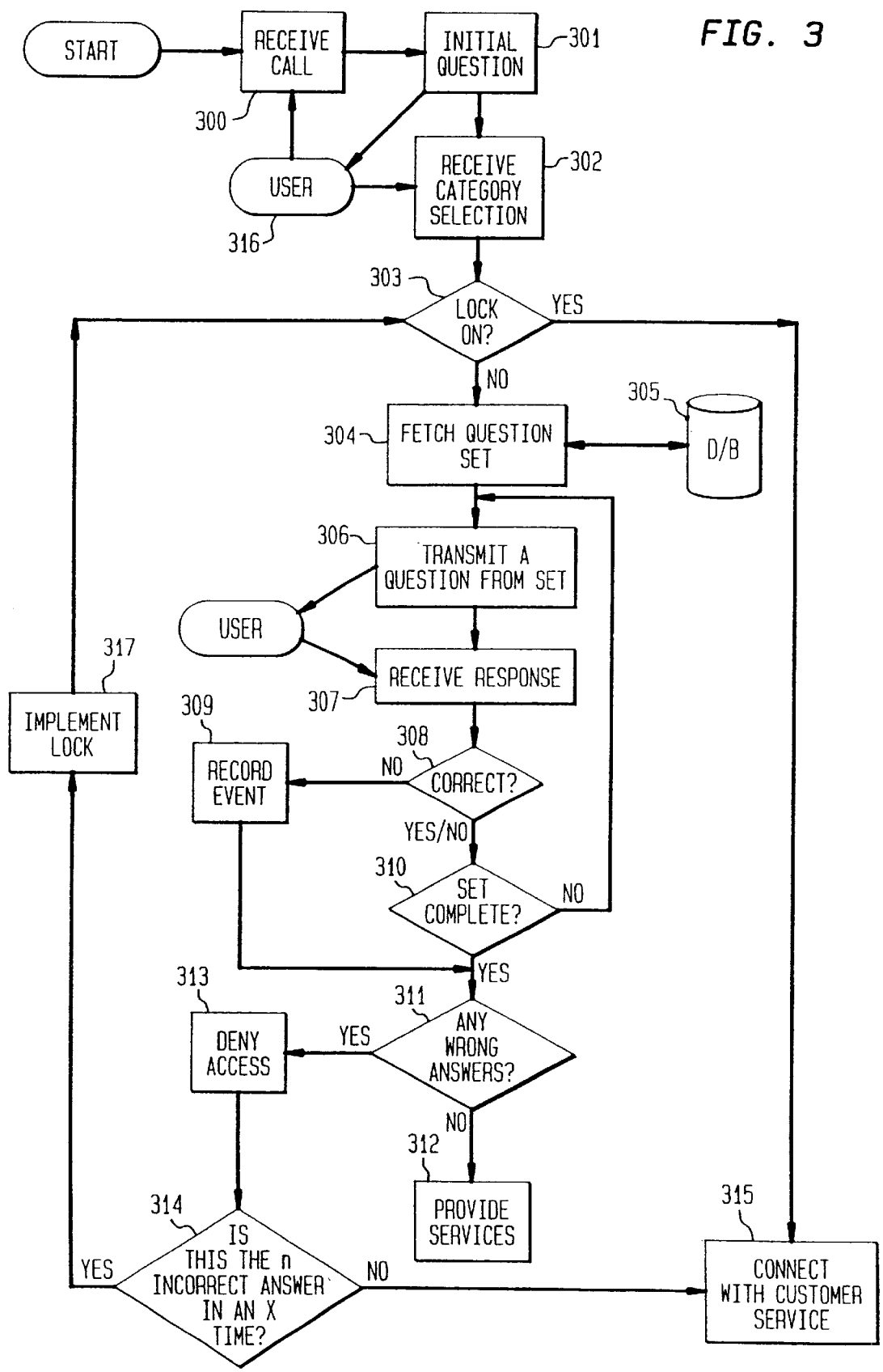
FIG. 3 shows a flow chart of a preferred embodiment.

Referring now to the flow diagram of FIG. 3, a more detailed description of the process will be considered in light of preferred and alternative embodiments. In this embodiment, the receiving means is represented by Blocks 300, 301, and 302. Block 300 receives a call from a user 316, and Block 301 responds with an initial information request. The initial information request prompts the user to select a certain category. For example, the user may be requested to enter an account number or his or her name. The user 316 makes his selection by entering the numbers or letters via DTMF or by speaking commands that are easily understood by the system. Block 302 receives the user's selection.

In this embodiment, locking means are employed which is discussed in greater detail below. For now, it should be understood that this embodiment of the locking means Block 303 determines whether a "lock" condition is imposed once the user selects a category. If a "lock" has been imposed, then the user's request may be terminated or forwarded to a customer service representative in Block 315 for special processing. On the other hand, if no lock condition exists, then the user's request proceeds to Block 304.

Once a particular category (e.g., an account number) is selected, the system accesses private information related to this category. In the preferred embodiment, Block 304 fetches a question set corresponding to the specific category from a data base 305. The question set has at least one question and at least one possible answer. In Block 306, the question is transmitted along with the list of possible answers to the user 316.

Suitable question sets relate to private information that a person having rightful access to the confidential information should know. The private information may be related to the confidential information, for example, the date of the last transaction of a particular account. It may be preferable, however, for the private information to be more of a personal nature for easier recall. For example, the private information may be the maiden name of the account holder's mother, the account holder's favorite color, or the birth date of his oldest child. Such information is memorable for a particular person but not generally known. It should be understood, however, that the choice of the private information is discretionary providing it is not generally known except by those entitled to access the confidential information.

Rather than asking an open-ended question where the user's response must be interpreted, the method of the present invention presents a closed-ended question. As used herein, the term "closed-ended question" broadly refers to a question wherein the possible responses are limited and known at the time the question is asked. Because the possible responses are limited and known, they can be anticipated and readily understood without the need for sophisticated voice recognition systems. A preferred way of posing a closed-ended question is to present a possible answer, or answers, with the question. To respond to the closed-ended question, the user simply responds whether the possible answer is correct or incorrect, or selects the correct answer from a list of possible answers. Thus, the user's response may be in the form of true/false, yes/no, correct/incorrect, or a selected multiple choice answer, or any other response form for a closed question. Such simple responses enable the user to respond using reliable telecommunication input forms such as touch tones (DTMF) or simple voice commands. For example, the user can enter 1 for true or 2 for false, or he can actually state "true" or "false" over the phone. Simple statements, such as "yes," "no," "true," "false," spoken numbers and letters, or other indicators like "first," "second," "third," etc., can be recognized by a computer independent of a user's voice characteristics. This obviates the need for sophisticated speech recognition software and sound libraries.

The form of the question and the possible answer(s) may vary considerably, providing the question requests information and the possible answer(s) provides a plausible answer. The question and possible answer(s) may be distinct or they may be combined in a single statement, question, or request. For example, if the category selected relates to a personal banking account, a typical question from the question set may be presented as a request as follows:

Please enter the number corresponding to your mother's maiden name:

1. Clark
2. Sepede
3. Daniels or
4. Rossi

Here, the information being requested is the user's mother's maiden name and a list of possible answers is provided. The user would then enter the correct number using a DTMF or simple voice command. Alternatively, the question may be rephrased as a series of independent questions as follows:

True or false, your mother's maiden name is Clark?

True or false, your mother's maiden name is Sepede?

True or false, your mother's maiden name is Daniels?

True or false, your mother's maiden name is Rossi?

Each independent question is essentially requesting information regarding the user's mother's maiden name by asking whether the possible answer, e.g., "Clark," is true of false. In this case, the possible answer is combined with the question. After each question is read, the user would be prompted to response true of false either by speaking or by entering a number or letter assigned to true or false. It should be noted that in the latter format it is not necessary that a correct maiden name is given-the correct response for each question may be false. In yet another embodiment of the question form, the appropriate response may be implied by the question form and not actually transmitted. In other words, yes/no, true/false, and similar responses may be inherent in the question's form. For example, the system may transmit the question:

Is your mother's maiden name Clark? or

Your mother's maiden name is Clark.

The possible responses of yes and no are implied by the question and understood by the user. Still other forms of the question/possible answer(s) and responses are possible.

For increased security, it is preferred that the possible answer(s) corresponding to a particular question remains substantially the same each time the question is transmitted to a caller. Otherwise, a caller, attempting to infiltrate the system through repeated trial and error, may infer the correct response by observing whether a possible answer is consistently provided.

Referring back to FIG. 3, Block 307 then receives a response selection from the user 303 which identifies the possible answer as being correct or not. A correct response may identify a correct possible answer by indicating it as such (e.g., true/false) or by selecting it over other possible answers (multiple choice). Likewise, a correct response may identify an incorrect possible answer by also indicating it as such, or by selecting another possible answer over it. A determination is made in Block 308 whether the response correctly identified the possible answer as being correct or not. The result of this determination is stored in Block 309.

Although the present invention provides a level of security with just one question in the question set, it is preferred that the question set contain a multiplicity of questions for greater security. The increased number provides increased protection against an imposter randomly entering responses. The reason behind this preference relates to simple statistics. If only one question is asked with four possible answers, the caller has a twenty five percent probability of responding to the question correctly merely be guessing. This guessing probability, however, drops to 1.5% if three question, each having four possible answers, are presented.

In one embodiment that offers multiple question capability, a predetermined number is set which corresponds to the number of questions to be asked from the question set. If the predetermined number is one, only one question is asked; conversely, if the predetermined number is all the questions, the system will transmit all the questions of a question set. If the user chooses a number between one and all the questions, the system then may randomly select questions until the number of questions transmitted equals the predetermined number.

Referring back to FIG. 3, Block 310 determines whether a predetermined number of questions from the question set have been transmitted. If not, then the process returns to Block 306 wherein a different question is transmitted to the user. If the predetermined number of questions have been transmitted, then the process proceeds to Block 311. In the case of a question set with only one question, the predetermined number is necessarily one, and Block 310 automatically proceeds to Block 311.

It should also be noted that, in the preferred embodiment, the system transmits all the questions before making a determination whether to provide the desired service. Moreover, when the determination to provide or deny service is made, it is done without explanation. This way, the user receives no feedback as to which responses were correct or incorrect. Thus, even if the user guesses the first question incorrectly, the system will nevertheless proceed through the remaining question in a normal fashion. Afterward, the system will inform the user that service has been denied, without elaborating on why, and possibly put him in contact with a customer service representative. Although this procedure is preferred, it is not necessary, and if the predetermined number is set to one, the system will determine whether or not to provide services after each response.

After the predetermined number of questions have been transmitted, Block 311 determines whether the number of incorrect user responses exceeds a certain limit. It should be understood that the certain limit of incorrect responses is necessarily the inverse of the number of correct responses. The choice to record either correct or incorrect responses is purely arbitrary. The certain limit corresponds to the tolerance of the system. If the certain limit is set to zero incorrect responses, then the system is intolerant of any incorrect response, and the caller must respond correctly to all the questions to receive the desired service. The tolerance of the system can be increased simply by increasing the certain limit. Although the certain limit of incorrect (or correct) responses can be set to any value, for greatest security, it is preferably set to zero.

If Block 311 determines that the number of incorrect responses is below the certain limit, then Block 312 provides the user with a desired service. If Block 311 determines that the number of incorrect responses exceeds the certain limit of the predetermined number of questions, then Block 313 refuses the user the desired service. At this point, the system may dispose of the caller in any manner seen fit, such as by disconnecting the caller, automatically transferring the caller to a customer service representative in Block 315 for personal integration, or activating a "lock" condition in Block 317.

A problem faced by an automated security system is an intruder attempting to gain access by repeated trial and error. Theoretically, access could be obtained by systematically entering all response permutations. Therefore, a reliable system must account for such repeated attempts to gain access, and implement safeguards against it. To that end, one embodiment of the present system offers locking means. The locking means prevents access to the system once intruder-like activity is encountered. In one embodiment, the locking means comprises Blocks 314, 317 and 303. Block 313 determines whether the number of incorrect responses exceeds a predetermined lock limit. The lock limit may be a cumulative limit that maintains a running total of incorrect responses received to date for a particular category. Alternatively, the limit may be tempered by correlating the number of incorrect responses to a period of time; that is, "n" number of incorrect responses within "x" time period. For example, n may be 5 and x may be one hour, such that when more than 5 incorrect responses are received within an hour a lock condition results. It should be noted that if the time period is extended to "infinite," this limit effectively becomes a cumulative limit as well. The choice of limits is totally discretionary, and may be dependent on such factors as the number of incorrect responses, the number of incorrect responses in a given time period, the number of denied access in a particular time period, a sudden increase in denied access rate, and any other relationship the user may feel is relevant to the behavior of an intruder.

Once the number of incorrect responses exceeds the lock limit, Block 317 implements a lock on the system. The functionality of the lock condition is user dependent. In the embodiment shown in FIG. 3, Block 303 determines if a lock condition exists. If so, the process proceeds to Block 315 wherein a customer service representative handles the user. Alternatively, the lock condition may prompt a call to the owner of the information to ascertain why a number of failed attempts have been recorded, or to warn the owner of a possible intruder. The action taken in a lock condition is presumably related to the value of the information the system is intended to protect. For example, more critical information may prompt the system to assume a proactive role such as initiating a call to the account owner if intruder like activity is encountered.

Obviously, numerous modifications and variations of the present invention are possible in the light of the above teachings. It is therefore understood that within the scope of the appended claims, the invention may be practiced otherwise than as specifically described herein.

What is claimed is:

1. A method of ascertaining the authenticity of a user using an automated computer system before providing said user with a desired service, said method comprising performing the following steps using an automated computer system:
   a. receiving a request for a desired service from said user;
   b. transmitting a multiplicity of closed-ended questions to said user concerning information specific to said user wherein each closed-ended question provides the possible responses or the possible responses are inherent in the question;
   c. receiving responses to said closed-ended questions from said user; and
   d. providing said user with said desired service only if the number of incorrect responses to said closed-ended questions does not exceed a certain limit.

2. The method of claim 1, wherein all of said multiplicity of closed-ended questions are transmitted to said user before either refusing said user said desired service if the number of incorrect responses exceeds said certain limit or providing said user with said desired service if the number of incorrect responses does not exceed a certain limit.

3. The method of claim 1, wherein the possible answers to said multiplicity of closed-ended questions remains substantially similar each time they are transmitted to a user.

4. The method of claim 3, further comprising:
   imposing a lock condition such that said user cannot obtain said desired services using said method if the number of incorrect responses over a predetermined period exceeds a lock limit.

5. The method of claim 4, wherein all of said multiplicity of closed-ended questions are transmitted to said user before either refusing said user said desired service if the number of incorrect responses exceeds said certain limit or providing said user with said desired service if the number of incorrect responses does not exceed a certain limit.

6. A method of ascertaining the authenticity of a user using an automated computer system before providing said user with a desired service, said method comprising using an automated computer system to perform the following steps:
   a. receiving a request for a desired service from said user;
   b. fetching a question set corresponding to said user, said question for reducing guessing set having a multiplicity of closed-ended questions wherein the possible responses to each closed-ended question are either provided by the question or inherent in the question;
   c. transmitting a closed-ended question from said question set to said user;
   d. receiving a response from said user selected from said possible responses;
   e. recording whether said response is correct or incorrect;
   f. reiterating steps c through e at least once and until a predetermined number of closed-ended questions of said question set have been transmitted to said user, and g. providing said user with said desired service if the number of incorrect responses does not exceed a certain limit.

7. The method of claim 6, wherein said question set relates to private information.

8. The method of claim 7, wherein said response is selected from the group consisting of true/false, yes/no, and multiple choice indica.

9. The method of claim 6, wherein the possible responses corresponding to a particular closed-ended question remain substantially the same each time said closed-ended question is transmitted to a user.

10. The method of claim 6, wherein said predetermined number of questions from said question set is all the questions from said question set.

11. The method of claim 6, wherein said certain limit is 0.

12. The method of claim 6, further comprising:
   imposing a lock condition such that said user cannot obtain said desired services using said method if the number of incorrect responses over a predetermined period exceeds a lock limit.

13. The method of claim 6, further comprising:
   receiving a call from a user;
   transmitting an initial question to said user, said initial question requesting a selection of a particular user specific category; and
   receiving a selection for a particular user specific category.

14. An apparatus for ascertaining the authenticity of a user before providing said user with a desired service, said apparatus comprising:
   a processor;
   a telephone network interconnection operatively connected to said processor, said telephone network interconnection having means for transmitting and receiving messages between said user and said apparatus;
   a database operatively connected to said processor, said database having information pertaining to a particular user specific category;
   memory operatively connected to said processor, said memory having instructional means residing therein for enabling said processor to perform the following process:
   a. receiving a request for a desired service from said user;
   b. fetching a question set corresponding to said user, said question set having a multiplicity of closed-ended questions wherein the possible responses to each closed-ended question are either provided by the question or inherent in the question for reducing guessing;
   c. transmitting a closed-ended question from said question set to said user;
   d. receiving a response from said user selected from said possible responses;
   e. recording whether said response is correct or incorrect;
   f. reiterating steps c through e at least once and until a predetermined number of closed-ended questions of said question set have been transmitted to said user, and
   g. providing said user with said desired service if the number of incorrect responses does not exceed a certain limit.

15. The apparatus of claim 14, wherein the possible responses corresponding to a particular closed-ended question remain substantially the same each time said particular closed-ended question is transmitted to said user.

16. The apparatus of claim 14, wherein said instructional means further enable said processor to perform the following step:
   imposing a lock condition such that said user cannot obtain said desired services using said apparatus if the number of incorrect responses over a predetermined period exceeds a lock limit.

* * * * *